United States Patent [19]
Ganesan et al.

[11] Patent Number: 5,758,294
[45] Date of Patent: May 26, 1998

[54] RADIO PORT IN A WIRELESS PERSONAL COMMUNICATION SYSTEM

[75] Inventors: Kalyan Ganesan, Germantown; Ranjan Pant; Victor Liau, both of Gaithersburg; Tayyab Khan, Germantown; Desmond Coughlin, Ijamsville, all of Md.; Harry Johnson, Springfield, Va.

[73] Assignee: Hughs Electronics Corporation, El Segundo, Calif.

[21] Appl. No.: 476,848

[22] Filed: Jun. 7, 1995

Related U.S. Application Data

[63] Continuation-in-part of Ser. No. 344,272, Nov. 23, 1994.

[51] Int. Cl.[6] ............................. H04Q 7/20
[52] U.S. Cl. ................ 455/561; 455/422; 455/562; 370/314
[58] Field of Search ................. 455/277.2, 277.1, 455/33.1, 33.2, 33.3, 33.4, 60, 53.1, 84, 86, 89, 315, 209; 379/56, 58, 59; 370/95.3, 95.1, 336, 337, 347, 442, 321, 323; 348/10, 19

[56] References Cited

U.S. PATENT DOCUMENTS

5,459,873  10/1995  Moore et al. .................. 455/33.3 X
5,592,480  1/1997  Carney et al. .................. 370/347

*Primary Examiner*—Dwayne D. Bost
*Assistant Examiner*—Nay Maung
*Attorney, Agent, or Firm*—John Whelan; Michael Sales

[57] ABSTRACT

The present invention relates to a radio port in a wireless personal communications system. The radio port includes a first channel in communication with a first subscriber unit, a second channel in communication with a second subscriber unit, and a switching device connecting the first channel to the second channel so that the first subscriber unit may communicate directly with the second subscriber unit. In another preferred embodiment, the radio port includes a plurality of antennas, an RF receive section, an RF transmit section, an analog port adapted for connection to an analog telephone line, a digital dataport for receiving and transmitting digital signals, and a databus interconnecting the RF receive section, RF transmit section, analog port, and digital dataport. The RF receive section includes a diversity selection unit receiving an input signal from each of the antennas. The RF transmit section generates an output signal to be transmitted over at least one of the antennas.

18 Claims, 8 Drawing Sheets

RADIO PORT IN A WIRELESS PERSONAL COMMUNICATION SYSTEM

CROSS-REFERENCES TO RELATED APPLICATIONS

The present application is a continuation-in-part of application Ser. No. 08/344,272, filed Nov. 23, 1994, entitled "Wireless Personal Communication System," by inventors K. Ganesan, et.al., currently pending (attorney docket number PD-N94022). The above identified application in its entirety is incorporated herein by reference.

BACKGROUND OF THE INVENTION

Wireless access communications systems (WACS) and personal access communications systems (PACS) strive to provide flexible communication services in a wireless fashion. WACS and PACS, in personal communication services (PCS) environments, may provide a system for improving or eliminating drop wire requirements to homes and businesses. Radio transmitters are the vehicle for eliminating the need for wiring.

While cellular telephones and cordless telephones also provide some wireless features, certain limitations are inherent in each of these systems. Cellular telephones transmit signals to cellular base stations at relatively high power levels. The high power levels require Federal Communications Commission (FCC) approval and careful frequency planning to avoid unwanted interference. Additionally, the cellular base stations tend to be complicated and expensive units. Cordless residential telephones are lower power devices, but the frequencies are usually prone to interference. Also, cordless phones require wire connections to the public telephone lines and cannot communicate with wireless access communication PCS systems. Furthermore, cellular phones and cordless phones are generally not capable of supporting both voice and data transmissions.

A typical architecture for a wireless PCS system includes subscriber units (SUs), radio ports (RPs), one or more radio port controllers (RPCs), and an access manager (AM). The SUs transmit information to the RPs using radio frequencies. RPs are small devices typically mounted to existing utility poles. The RPs are connected to an RPC using wireline facilities. Each RPC is connected to a switch that is part of the public switched telephone network (PSTN) and the AM. The AM provides overall coordination of the call handoff across RPCs, has the function of mobility management, and supports subscriber related features such as registration and authentication.

A consortium of telecommunication entities has recently developed a proposed standard for providing WACS PCS. This standard outlines the above-mentioned architecture. Further details concerning this proposed standard are set out in Bellcore Corp. publication TR-INS-001313 entitled Generic Criteria for Version 0.1 Wireless Access Communications Systems (WACS) published October 1993 (herein sometimes referred to as the specification). The publication is available to those interested in WACS PCS from Bellcore Corp. at Bellcore, Customer Services, 8 Corporate Place—Room 3C-183, Piscataway, N.J. 08854-4156, or at 1 (800) 521-CORP. Also, the reader may refer to Bellcore manual SR-ARH-002315 describing specific modulator and demodulator requirements in the SU and the RP. Additionally, the U.S. Telecommunications Industry Association (TIA) has recently approved a PACS standard as set forth in TIA publication JTC(AIR)/95.4.20-033R2. The reader is presumed to be familiar with the specification and with related technological issues known to those having ordinary skill in the art.

Although general standards have been set forth, advances and improvements to the technology have been discovered including implementation of novel configurations and circuitry. The present invention is directed toward such improvements relating to the radio port.

SUMMARY OF THE INVENTION

The present invention relates to a radio port in a wireless personal communications system. The radio port includes a plurality of antennas, an RF receive section, an RF transmit section, an analog port adapted for connection to an analog telephone line, a digital dataport for receiving and transmitting digital signals, and a databus interconnecting the RF receive section, RF transmit section, analog port, and digital dataport. The RF receive section includes a diversity selection unit receiving an input signal from each of the antennas. The RF transmit section generates an output signal to be transmitted over at least one of the antennas. Preferably, the plurality of antennas are positioned spatially and angularly diverse from each other, and the diversity selection unit preferably uses a signal randomization process, such as a frequency hopping process, an antenna hopping process, or a time interleaving process.

In another embodiment, the radio port includes a first channel in communication with a first subscriber unit, a second channel in communication with a second subscriber unit, and a switching device connecting the first channel to the second channel so that the first subscriber unit may communicate directly with the second subscriber unit. The switching device is preferably a time slot interchange unit.

Another preferred embodiment incorporates the radio port into a wireless communications system including a communications link, a first radio port, and a second radio port in direct communication with the first radio port via the communications link. The communications link may carry audio, video, and/or data signals and may use any method of communication, preferably digital, such as a Ti line, coaxial cable, microwave connection, or fiber optic link.

The communications link may be unused portions of bandwidth available on existing cable television wires. In a particular embodiment a plurality of RPs may be directly linked together such as in a local area network arrangement.

Another aspect of the present invention is that the RP may include a method of modulating and demodulating signals for communication over unused bandwidth of CATV cabling. The radio port may be connected to a radio port controller by cable television wire where the radio port controller is at the headend of a CATV communication link. In this embodiment, a cable television provider may conveniently provide telephone service as well as cable television to their customers, and/or existing cabling may be used to minimize installment cost of a wireless PCS system.

The invention itself, together with further attendant advantages, will best be understood by reference to the following detailed description, taken in conjunction with the accompanying drawings.

BRIEF DESCRIPTION OF PREFERRED EMBODIMENTS

3

DETAILED DESCRIPTION OF PREFERRED EMBODIMENTS

Figure 1:
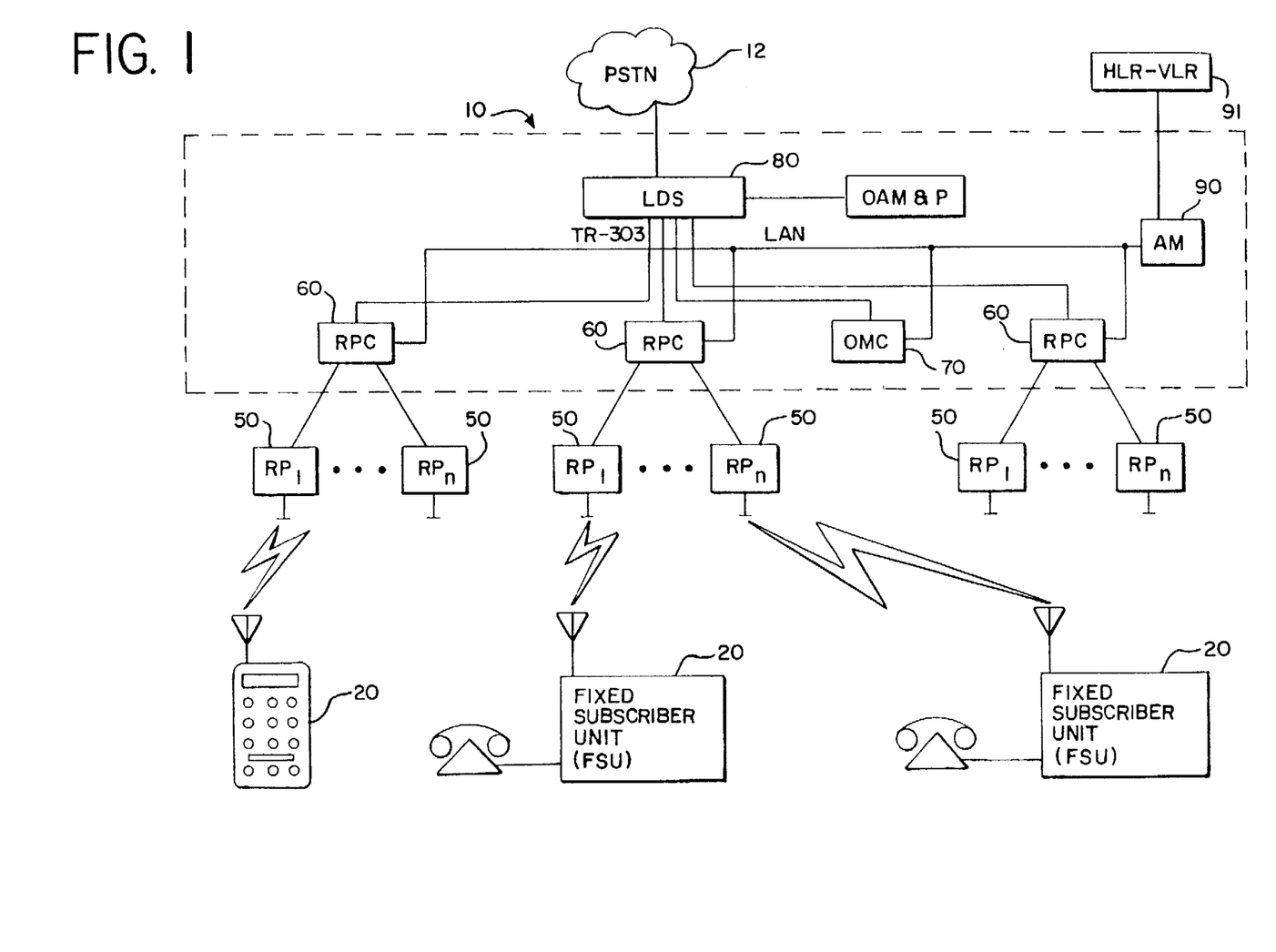
FIG. 1 is a block diagram of a wireless access communication system.

FIG. 1 illustrates a general block diagram of a wireless access communication system (WACS) 10. The WACS 10 includes subscriber units (SU) 20, radio ports (RP) 50, radio port control units (RPC) 60, an operations maintenance center (OMC) 70, a local digital switch (LDS) 80, and an access manager (AM) 90. The SU 20 communicates with the radio port 50 via radio links. Each RP 50 communicates with an RPC 60 via transmission lines, typically standard T1 lines. The RPC 60 controls radio links and transmission lines carrying various voice and data communications. The switch 80 controls access between wireless access communication systems (WACS) 10 and the public switch telephone network (PSTN) 12. The AM 90 provides call control, communicates with the switch 80 to provide voice paths between the WACS network and the PSTN, and connects to a home location register-visitor location register (HLR-VLR) 91. Additional details are known to those skilled in the art and are set forth in the Bellcore specification. Recently, a newer proposed standard, personal access communications (PACS), has been introduced. Both WACS and PACS standards, however, may be implemented on the system described below.

In standard WACS/PACS PCS, the radio port (RP) 50 performs the basic function of transmitting and receiving voice and data information between the SU 20 and the RPC 30. The RP 50 exchanges information with one or more SUs 20 over a radio link at RF frequencies, preferably in the range of 1.8 to 2.2 GHz. The RP 50 may exchange information with a single RPC 30 over a standard T1 transmission line. In addition, one or more RPs 50 may communicate with the RPC 30 over a DS1 interface, a high bit-rate digital subscriber loop (HDSL) interface, or a T1 interface.

Figure 2:
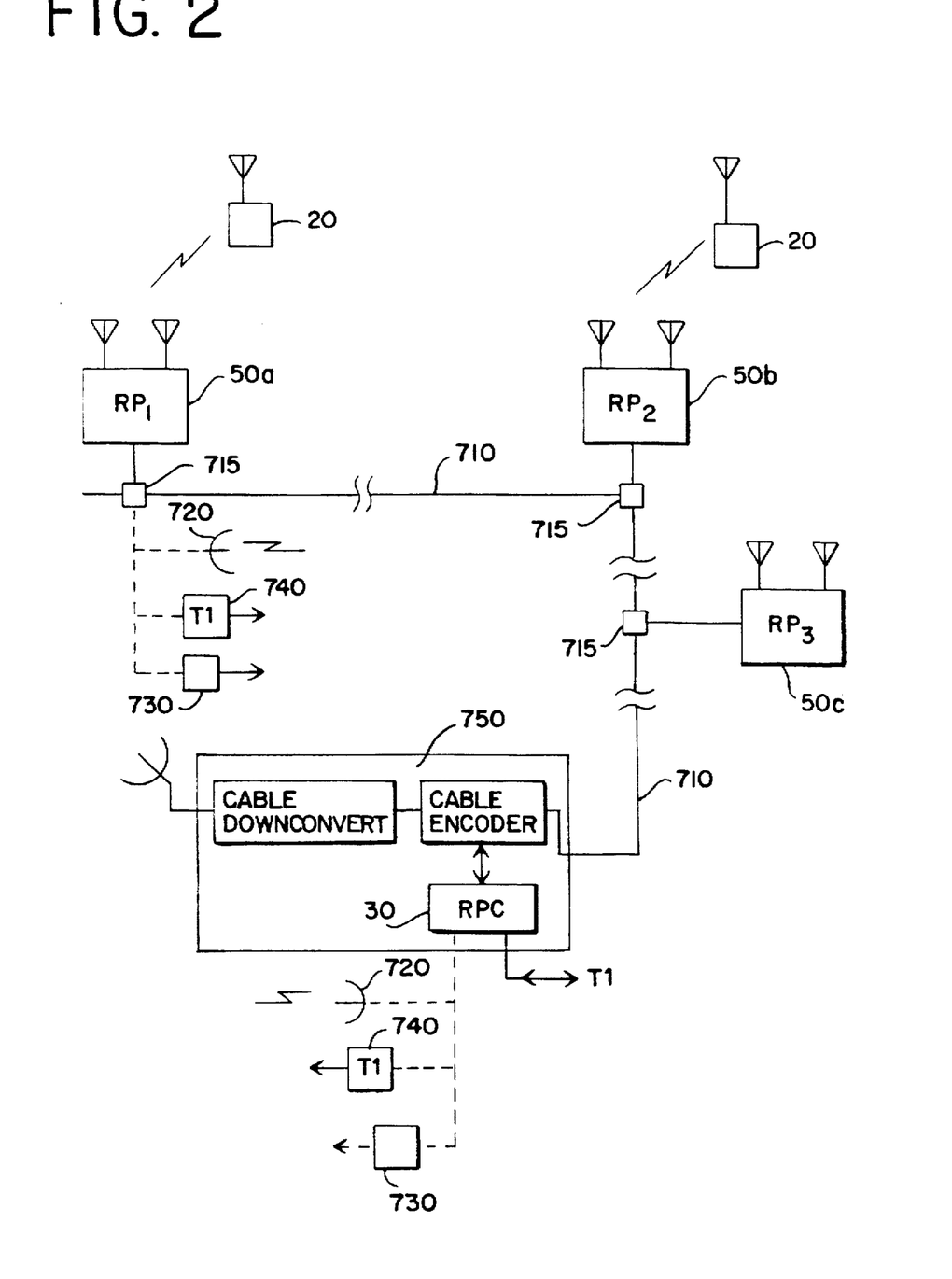
FIG. 2 is a block diagram of a preferred interconnection of RPs.

Additionally, referring now to FIG. 2, in a preferred embodiment the RP 50 - RPC 30 interface may be a microwave 720, optical 730, T1 740, or cable television line 710 interface. In one embodiment shown diagrammatically in FIG. 2 the RPs 50a, 50b and 50c may be configured to utilize existing CATV cabling for RP 50 - RPC 30 communication (or RP to RP communications in alternative embodiments discussed herein). The network of RPs may connect to a RPC 30 at a cable headend device 750. Existing unused bandwidth in the return band of the frequency division multiplexed television signals may be used on the CATV cabling 710. The CATV downstream and upstream signals are preferably frequency division multiplexed with the RPC to RP data signals and RP 50 to RPC 30 data signals respectively, such as by interfaces 715. These interfaces may be part of the RP or may be external converters attached to the data input/output ports of a basic RP. The cable television return band is approximately 5 to 50 MNz. Both voice and data information may be sent in either direction along any of the RP-RPC (or RP-RP) interfaces 715. At higher data rates,

4 video telephone calls having both audio and video components may be transmitted along these interfaces.

An RP 50 is less expensive to manufacture and easier to use than a base transceiver system in a cellular network. Typically, an RP 50 is mounted onto an existing telephone pole, the side of a building, or inside a building. In-building installations would be employed for providing enhanced wireless services as part of a wireless Centrex or PBX service arrangement. RPs 50 may not perform any special per-call processing on signals, such as subscriber registration or authentication, and may therefore be inexpensively produced.

Figure 3:
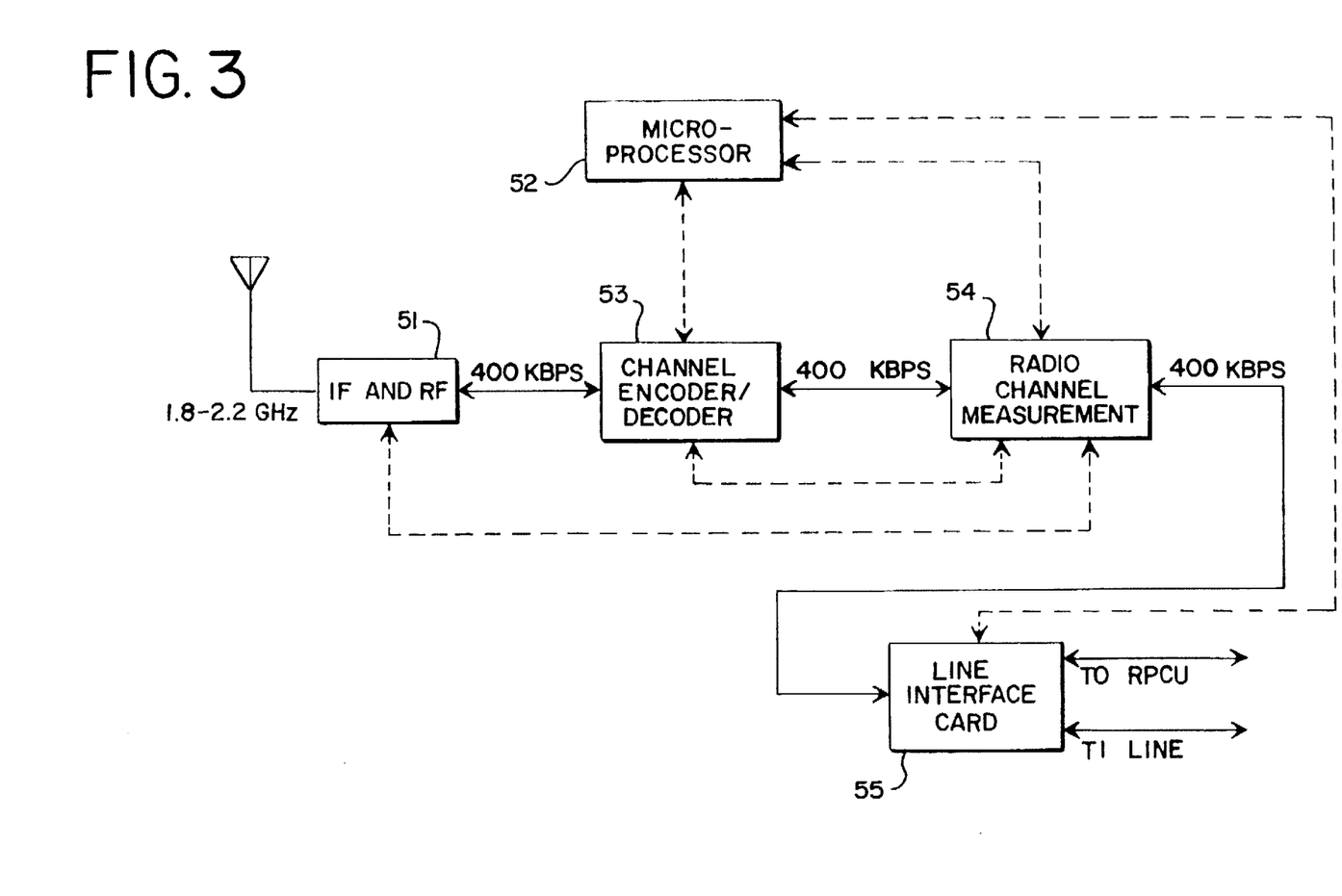
FIG. 3 is a functional block diagram of a RP.

FIG. 3 best shows a functional block diagram of a basic RP 50. The RP 50 generally performs several functions including: transmission/reception of the radio frequency signals, channel coding/decoding of signals for synchronization with the network, and general performance measurements. The RP 50 contains an IF and RF section 51 receiving and transmitting information signals at RF frequencies over an antenna or antennas. Received RF signals at the IF and RF section 51 are downconverted to a 400 kilobits per second (kbps) data stream and sent to the channel encoder/decoder 53 function block. Although the 400 kilobits per second data rate used in WACS is shown in a preferred embodiment, other data rates are equally suitable, such as 384 kbps which is used in PACS applications. The channel encoder/decoder 53 function is controlled by a microprocessor 52. The channel encoder/decoder 53 function involves managing the timing of signals arriving and leaving the RP 50. The microprocessor function 52 also manages the channel encoder/decoder 53 such that information received from an RPC is encoded into 32 kbps ADPCM for transmission to an SU 20.

The standard RP 50 also performs radio channel measurements measuring the performance of SUs 20 and the RP 50. Controlled by the microprocessor 52, the radio channel measurement 54 is made and information is sent to the RPC for processing with each burst. Voice and data signals broadcast over a radio link at RF frequencies are received at the RP 50. The RF frequencies are downconverted from the RF frequencies to a 400 kbps data stream in order to recover the information in the signal. The 400 kbps data stream is decoded, processed through a radio channel measurement unit 54 and then sent through a line interface card 55 for transmission over a T1 line connected to an RPC. The decoded information received from an SU 20 and sent on to the Ti line is preferably in a 64 kbps PCM format. Conversely, signals received from the RPC are processed first through a line interface card 55 controlled by a microprocessor 52 and then encoded and converted to RF frequencies for transmission to an SU 20.

Figure 4:
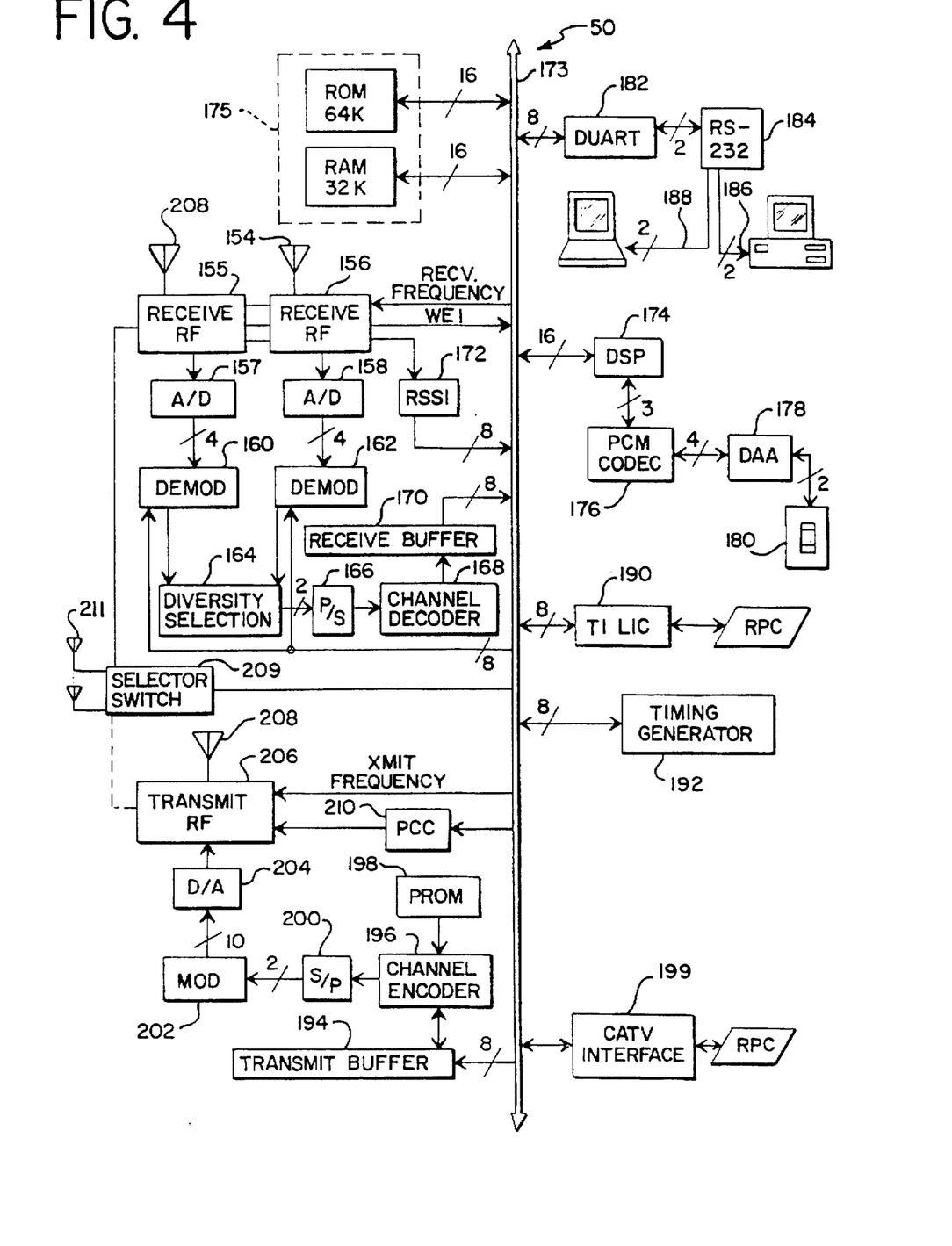
FIG. 4 is a block diagram of a preferred embodiment of the radio port of the present invention.

FIG. 4 illustrates a preferred embodiment of the RP 50 in more detail. The RP 50 receives RF frequency signals from one or more SUs 20 on at least two spatially diverse antennas 152, 154. An antenna selector switch 209 coupled to a plurality of antennas 211 is also included. The antenna switch 209 is connected to the databus 173, the RF receive sections 155, 156 and, optionally to the RF transmit section 206.

The RP 50 is tuned to receive a particular frequency by the digital signal processor 174, such as a TMS320C53. The received signal from the SU 20 is then downconverted in the receive RF sections 155, 156 respectively attached to the spatially diverse antennas 152, 154. Each receive RF section 155, 156 downconverts the same frequency and channels the downconverted signal to an analog-to-digital (A/D) converter 157, 158 respectively attached to the receive RF sections 155, 156. Preferably the A/D converters 157, 158 are 8 bit, 20 Megasample per second A/D converters such as a CXD1175AM-T6 manufactured by Sony Corporation. The digital signals are transferred to modem demodulators 160, 162, which may be implemented as a Xilinx XC4005 or Xilinx 4013 chip. Once the digital signals have been demodulated in the demodulating sections 160, 162 they are compared in a diversity selector 164.

Antenna diversity selection is described in standard WAC/ PACS PCS to produce the strongest signal possible in the radio port 50. At the diversity selector 164, preferably implemented with a Xilinx 4005 or Xilinx 4013 chip, the different RF downconverted signals demodulated in the demodulators 160, 162 are compared to find the best signal of the two that have been downconverted. Other forms of selection diversity may alternatively be employed such as known ratio combining or equal combining techniques. Ratio combining involves taking the better portions of each signal and combining the two portions to reconstruct the best signal. Equal combining requires taking equal amounts of both signals received on the antennas 152, 154 and combining them. Because the antennas 152, 154 are spatially diverse from one another, the RP 50 is more likely to receive a stronger signal. In a preferred embodiment, the antennas are positioned spatially and angularly diverse, and most preferably orthogonal, to one another.

In another preferred embodiment, a frequency hopping scheme may be used where the hopping rate is proportional to the frame transmission rate. For a frame rate of 2 ms, a frequency hopping rate of 500 Hz may be used to enhance robustness in reception of RF signals. Each RF frequency involved in frequency hopping is preferably separated by 300 KHz. Such a hopping mechanism also enhances the transmission range of each cell in the wireless PCS system. The above described advantages of frequency hopping may also be realized by an antenna hopping scheme.

Antenna hopping involves transmitting on different antennas to provide increased randomization in the RF signal received by an RP 5. Each RP 50 may be programmed to perform a predetermined antenna hopping sequence to improve reception. Preferably, the DSP in the RP 50 implements the antenna hopping sequence by controlling an antenna selector switch 209. The selector switch 209, in another embodiment, may also be connected to the transmit section 206 of the RP to implement antenna hopping for transmitted signals.

Another preferred embodiment may provide time diversity by interleaving a plurality of frames. Interleaving involves segmenting a digital signal, such as a digitized speech signal, over a predetermined number of message frames. The number of frames interleaved is proportional to the randomization in the received RF signal, but an increased number of frames increases transmission delay. A person skilled in the art may choose the optimal number of frames interleaved for a given application.

Figure 5:
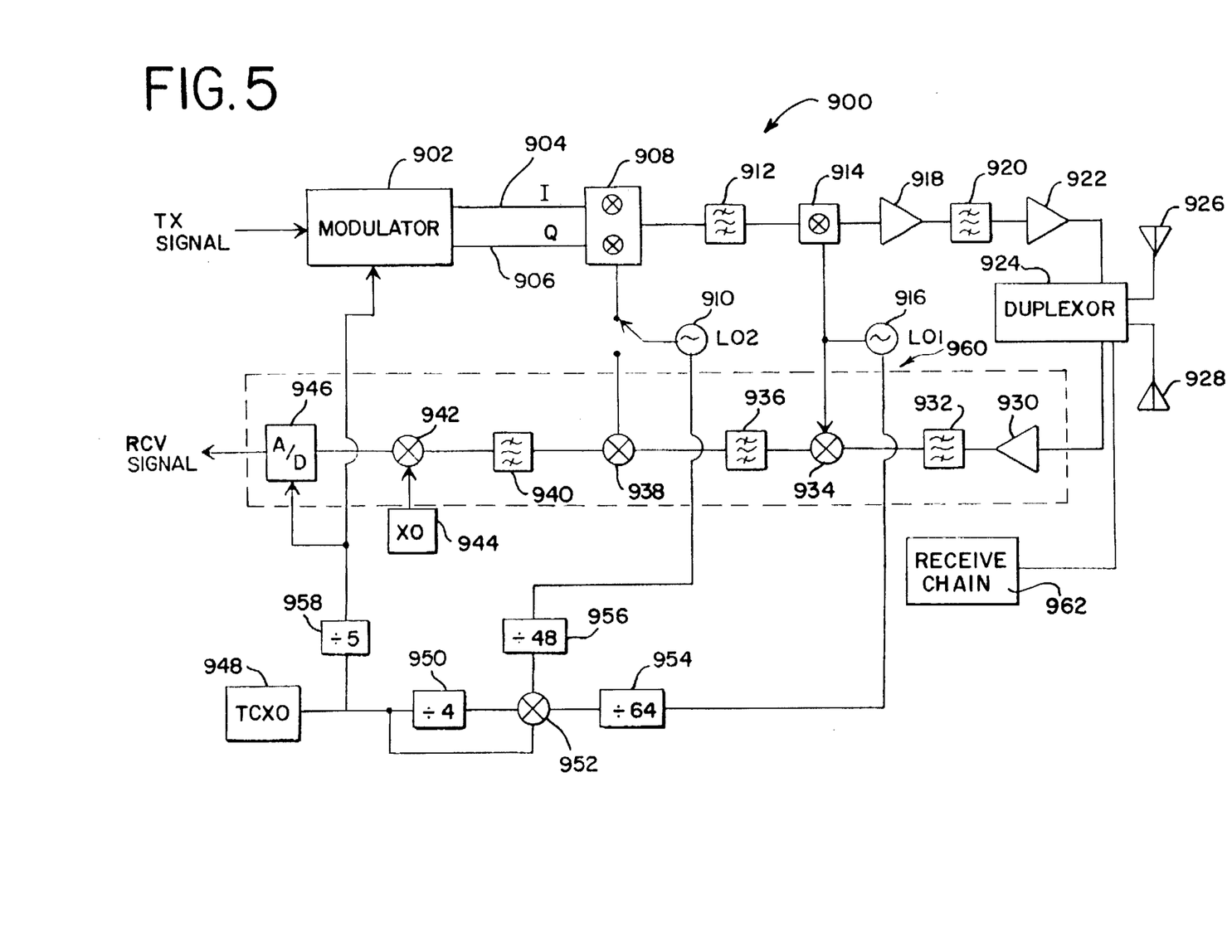
FIG. 5 is a block diagram of a preferred RF section of for use in the RP of FIG. 4.

FIG. 5 shows a block diagram of a preferred embodiment of an RF transmit and receive section 900 for a radio port. On the transmit (Tx) signal side, the RF section 900 has a modulator 902 that modulates the outgoing digital signal into I 904 and Q 906 lines which connect to a pair of I,Q mixers 908. The pair of I,Q mixers 908 utilize the reference frequency from a second local oscillator (LO2) 910 to mix the I and Q transmit signals 904, 906 to a first intermediate frequency (IF) transmit signal preferably centered at 295.15 MHz for licensed band frequency transmissions. The first IF transmit signal is then filtered in a bandpass filter 912, preferably a discrete circuit of inductors and capacitors centered at 295.15 MHz, before being mixed again in a mixer 914.

The mixer 914 receives the first IF transmit signal and a mixing frequency from a first local oscillator (LO1) 916. The LO1 is preferably capable of producing frequencies in the range of 2.125 to 2.205 Ghz adjustable in 300 kHz steps. The first IF transmit signal is mixed to a higher frequency second IF transmit signal in the mixer 914 preferably in the range of 1.91 to 1.99 GHz. After mixing, the second IF is passed through a first gain stage 918, a bandpass filter 920 with a pass band of preferably 1.91 to 1.99 GHz, and a second gain stage 922. Once the signal passes through the second gain stage 922, it proceeds through the duplexor 924 that multiplexes one of the receive antennas with the transmit antenna 926 for broadcast over the airwaves.

Received signals in the range of 1.85 to 1.93 GHz arrive at the two antennas 926, 928. The duplexor 924 connects one of the antennas to the first receive chain 960 of the RF section 900 and another antenna to the second receive chain 962 of the RF section 900. The second receive chain 962 contains the same components as the first chain 960 and receives the same oscillator inputs as shown for the first chain 960. The received signal is first amplified in a gain stage 930, such as a low noise amplifier to control the noise figure, and is then passed through a bandpass filter 932 with a pass band of 1.85 to 1.93 GHz to a mixer 934. The mixer 934 mixes the received signal with a reference frequency generated by LO1 916 to create a first IF receive signal. A bandpass filter 936 centered at 215.15 MHz and connected to the mixer 934 filters the first IF receive signal.

The filtered first IF is then mixed in a second mixer 938 and downconverted to a second IF preferably centered at 10.7 MHz. Another bandpass filter 940 filters the second IF and connects to a third mixer 942. The third mixer 942 down converts the second IF to a third IF, preferably centered at 768 MHz by mixing the second IF against a reference frequency. In a preferred embodiment the reference frequency is a 9.932 MHz signal generated by a crystal oscillator. The third IF continues on to an analog-to-digital (A/D) converter 946 and the rest of the RP circuitry for signal quality measurements and, in one embodiment, transfer of the voice or data to an RPC over standard T1 lines.

The RF transmit and receive section 900 is based on a frequency scheme determined by the reference oscillator 948 which is preferably a temperature controlled crystal oscillator (TCXO) set at 15.36 MHz. The TCXO 948 signal is passed through a divide-by-four (÷4) circuit 950 and connected to a mixer 952. The mixer 952, in one embodiment, may be an image rejection mixer. The mixer 952 receives the divided TCXO 948 signal and a signal directly from the TCXO 948. The mixer 952 mixes these frequencies to a higher frequency, preferably 19.2 Mhz. The 19.2 MHz reference frequency branches off into two paths. One path connects to a divide-by-48 (÷48) circuit 956 and the other path connects to a divide-by-64 (÷64) circuit 954. The ÷64 954 signal, preferably a 300 kHz signal, is connected to LO1 916. The ÷48 circuit 956 preferably produces a 400 kHz signal and is connected to LO2 910. The TCXO signal also passes through a divide-by 5 (÷5) circuit 958 for use by the A/D converter 946 as a 3.072 MHz reference. Other frequency schemes may be used and the TCXO signal may be used to create reference frequencies to the rest of the RP.

Referring again to FIG. 4, following reception and downconversion of the RF frequencies and diversity selection, the signal is processed through a parallel-to-serial (P/S) converter 166 and input in serial format to a channel decoder 168. The channel decoder 168 decodes the correlation information. In a preferred embodiment the channel decoder 168 comprises a Xilinx XC4005-6PQ208C chip. Information decoded in the channel decoder 168 is then forwarded to a receive buffer 170 prior to being sent on a databus 173 to a destination determined by the digital signal processor 174. Voice information is transmitted along the databus 173 to the DSP 174. In one embodiment, the DSP 174 decodes the 32 kbps ADPCM to 64 kbps PCM. The PCM Codec 176 receives the 64 kbps mu-law PCM and decodes it into an analog signal. The analog signal is then processed in a Data Access Arrangement (DAA) 178 for transmission along telephone lines.

If the information placed onto the databus 173 is data information, the data information is then directed by the DSP 174 to the appropriate dataports 188, 186. The dataports 188, 186 are connected to the databus 173 via a DUART which translates the information into an asynchronous serial input/output form that is then handed to an RS-232 port 184. Alternatively, if the voice or data information placed on the databus 173 is intended for processing through a WACS/PACS network, then the information may remain in 32 kbps ADPCM and be routed through a T1 transport 190, preferably an AT&T 1711SA chip, which interfaces with an RPC 30.

In an alternative embodiment mentioned above, where the RP 50 is connected to an RPC (or other RP) via existing CATV lines, the T1 transport 190 may be replaced with a CATV transport 199 capable of modulating/demodulating the information up to the 5-50 MHz band available on the CATV line. The CATV line may be a coaxial cable line. Referring again to FIG. 4, the CATV transport 199 may communicate with the databus 173 in the RP 50.

Voice information received from the telephone lines, RPC 30, or CATV transport 199 is transferred along the databus 173 to the transmit buffer 194 in preparation for encoding in a channel encoder 196. In a preferred embodiment the channel encoder is a Xilinx XC4005-6PQ208C chip. The encoder 196 is programmed with the algorithm disclosed in the Bellcore specification in firmware installed in a PROM 198. The RP 50 also has a memory block 175 for extra program storage capability. The channel encoder 196 encodes the received 32 kbps ADPCM signal with information regarding timing and synchronization. The encoded ADPCM signal is processed through a serial-to-parallel (S/P) 200 device to configure the signal for modulation in a modulator 202 which then transfers the signal to a digital-to-analog (D/A) converter 204. After conversion to analog form, the modulated signal is then converted to an RF transmission signal in a transmit RF section 206. The RF signal containing the encoded data is then transferred along the transmit antenna 208 to the appropriate SU 20. For transmission of data where no encoding is necessary the encoder 196 and S/P converter 200 are bypassed and the databus 173 is directly connected to the modulator 202. This decision may preferably be controlled by digital signal processor (DSP) 174.

Another feature embodied in the RP 50 is power control in connection with a subscriber unit 20. The radio port 50 collects data on received signal strength using a received signal strength indicator (RSSI) 172. The RSSI 172 is located on the RF receive portion of the RP 50. Also a word error indication bit (WEI) is received from an SU 20 and transferred through the DSP 174 to the RPC 30.

Generally the RP 50 transmits a time division multiplex (TDM) transmission with 8 time slots. The RP 50 uses one of the time slots as a system broadcast channel (SBC) for reference by the SU 20 in synchronizing frames transmitted. The SU 20 uses TDMA protocol so that it transmits into one of the 8 slots in bursts, the RP 50 transmits on all 8 slots in TDM mode. When transmitting, the RP 50 synchronizes with the rest of the system 10 using a timing generator 192 which preferably operates at 400 kHz. The timing aspects of the eight slot message 70 transmitted by the RP 50 is important both because information sent from an SU 20 must be synchronized to fit into the proper slot in a frame and because information transmitted to the RP 50 and then onto T1 lines must be synchronous with time slots available and expected by the system 10.

Figure 6:
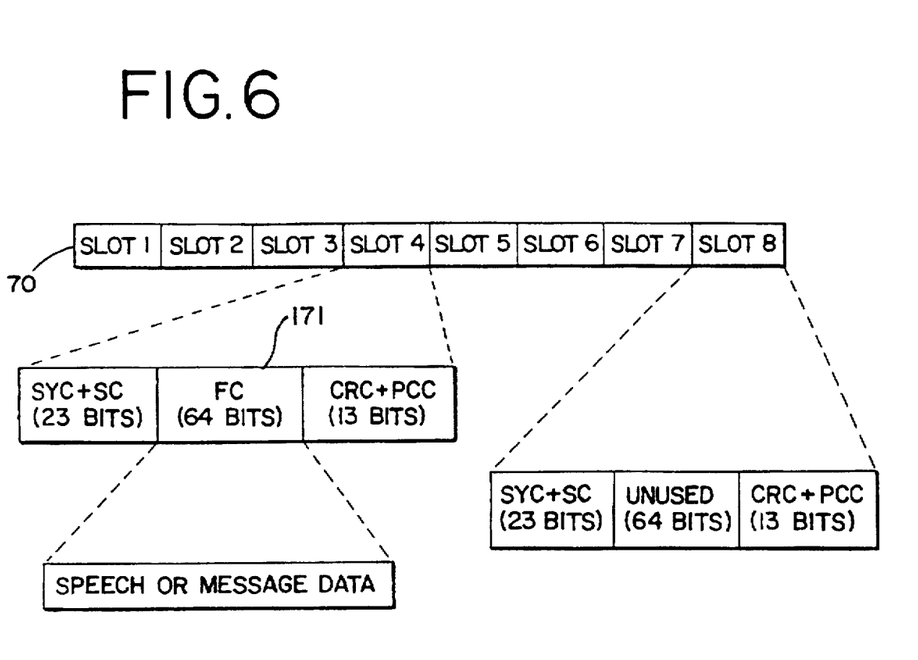
FIG. 6 is an illustration of a preferred message format sent by a RP.

As mentioned above, a preferred format for the interface between the RP 50 and the RPC is DS1 over a T1 line. Similar to the time slots in the eight slot message transmitted between SU 20 and RP 50 the T1 line connected to the RPC 30 also has DS1 time slots which must be synchronized with the information. Referring to FIG. 6, formatted information transmitted via RF frequencies from the RP 50 to the SU 20 is illustrated. The SBC time slot contains 100 bits as do the other 7 time slots.

Figure 7:
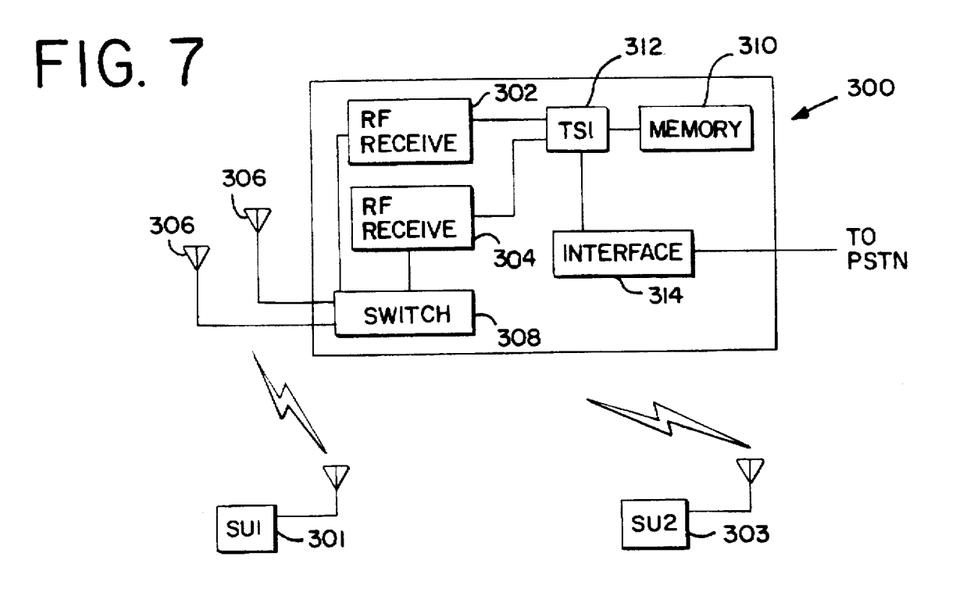
FIG. 7 is a block diagram of a hybrid RP configured to directly connect calls between two SUs.

As best shown in FIG. 7, the RP 300 may be configured to process calls between SUs 301, 303 in an intercom mode. When one SU 301 wishes to communicate with another SU 303 within range of a common RP, the RP 300 can connect the calls directly and avoid involving an RPC. The RP 300 preferably has two RF receive chains 302, 304 communicating with at least two antennas 306 through a switch 308. The RP 300 also includes a memory buffer 310 and a switching device for managing the information communicated over a first channel from a first SU 301 and information communicated on a second channel from a second SU 303. The channels may be TDMA time slots and the switching device 312 may be a time slot interchange unit (TSI). In order to minimize hardware complexity, the DSP 174 (FIG. 4) in the RP may function as the time slot interchange unit. The DSP may shift voice and data communications intended for intercom communications between the specific SUs 301, 303 into and out of existing memory buffers in the RP. The memory buffer 310 for temporarily storing the information between bursts may be excess space in the memory block 175 RAM or extra storage space on a Xilinx XC4005-6PQ208C, or similar, programmable logic array chip. The RP 300 may also have an interface section 314 connected to the TSI 312 for communicating with the PSTN directly, another RP, or an RPC using T1, CATV or other communications links as described above.

In a preferred embodiment a universal circuit board may be used to construct either a radio port 50 or a subscriber unit 20. Different components may be loaded depending on whether the universal board is to be an RP or an SU (or a hybrid RP/RPC in an alternative embodiment discussed herein). Alternatively, the universal circuit board may have all the functional elements for RP and SU configurations loaded and the specific configuration enabled may be determined by a simple hardware or software switch.

Figure 8:
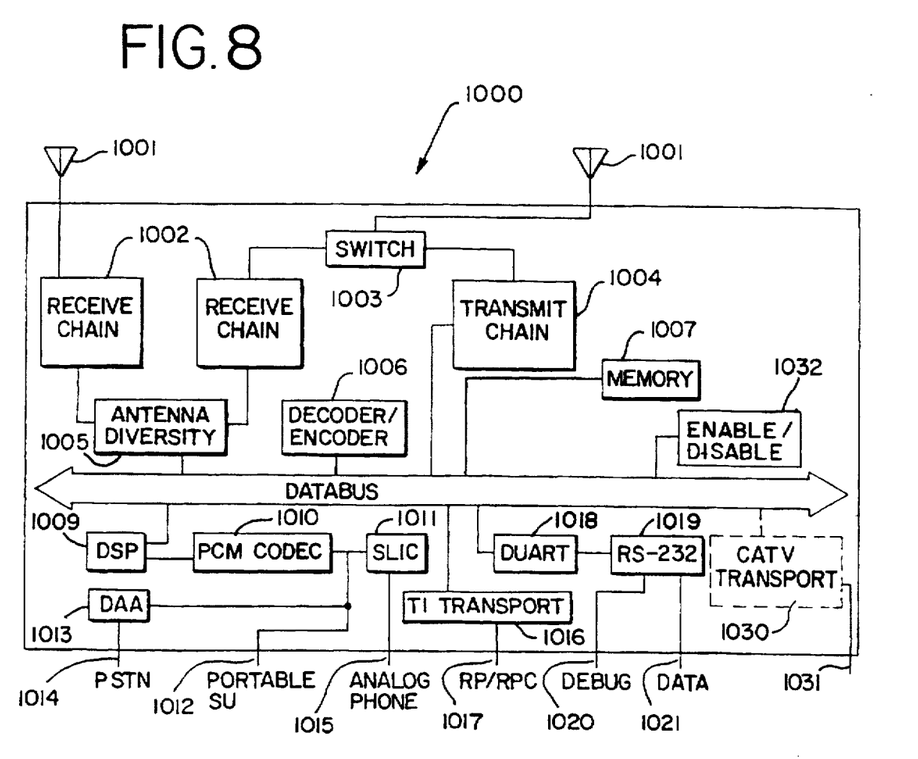
FIG. 8 is a block diagram of a universal circuit board for use in an RP or SU.

Referring to FIG. 8, the universal board 1000 has at least two antennas 1001 connected to two receive chains 1002. A transmit chain 1004 is connected to one antenna 1001 through a switch 1003. The switch 1003 may be a transmit/receive switch or a duplexor. The two receive chains connect at an antenna diversity selector 1005. The receive chains 1002 and the transmit chain 1004 are linked to a databus 1008. Also linked to the databus are an encoder/decoder 1006, and a memory block 1007. The board further contains a DSP 1009 connected to a PCM codec 1010. The DSP 1009 is also connected to the databus 1008. The PCM codec 1010 connects to a SLIC 1011, a portable SU connector 1012, and a DAA 1013. The DAA 1013 is connected to a PSTN port 1014 and the SLIC 1011 connects to an analog phone jack 1015. A T1 transport 1016 connects to the databus 1008 and to an RP/RPC port 1017. The data bus 1008 is further linked to a DUART 1018 which is, in turn, connected to an RS-232 connector 1019. The connector 1019 is linked to both a debug port 1020 and a data port 1021. A CATV transport 1031 may optionally be included on the universal board 1000. The CATV transport 1031 communicates with the databus 1008 and a CATV port 1031.

In a preferred embodiment of the universal circuit board 1000, an SU can be created by disconnecting or disabling one receive chain 1002, the DAA 1013, and the T1 transport 1016. In addition, the appropriate program for encoding/decoding signal synchronization is placed in the memory 1007. In an alternative embodiment, the encoding/decoding program for both the RP and SU may be loaded into the memory 1007 for later designation by instructions received at the debug port 1020, by a hardware switch on the universal board, or by a decision of the DSP 1009.

Differentiation between a fixed and a portable SU may also be made with the universal board 1000 in a preferred embodiment. By disabling or not connecting a SLIC 1011, in addition to the other changes necessary to create an SU, the board 1000 is suitable for use as a portable SU. A fixed SU is created by enabling or connecting a SLIC 1011 and disabling or disconnecting the portable SU connector 1012.

In another embodiment, the universal circuit board may be configured as an RP. By disabling or disconnecting the SLIC 1011 and the portable SU connector 1012, the universal board 1000 has substantially all the necessary functions to operate as an RP. The SLIC 1011 may be switchably enabled by a hardware switch 1032 connected to the databus or by a disable command from the DSP 1009. Further, another preferred embodiment of the universal board 1000 as an RP includes customizing the type of RP required for a specific configuration. For example, an RP that will only be used to directly connect to the PSTN does not need the T1 transport circuitry 1016. Power supply requirements on the universal board 1000 can be met by either including the necessary components or by external power supply circuitry both of which are easily accomplished by one of ordinary skill in the art. The presently preferred embodiment of the universal board 1000 adds flexibility to WACS/PACS PCS system planning and requires fewer parts to be carried in stock for repairs or replacements of system parts.

Additional advantages and modifications will readily occur to those skilled in the art. The invention, in its broader aspects, is therefore not limited to the specific details, representative apparatus, and illustrative examples shown and described. Various modifications and variation can be made to the present invention without varying from the scope or spirit of the invention, and it is intended that the present invention cover the modifications and variations provided they come within the scope of the appended claims and their equivalents.

What is claimed is:

1. A radio port for receiving and transmitting digital information using a TDM/TDMA protocol in a wireless personal communications system, said radio port comprising:

a plurality of antennas;

an RF receive section including a diversity selection unit receiving an input signal from each of the antennas;

an RF transmit section for generating an output signal to be transmitted over at least one of the antennas;

a databus interconnecting said RF receive section and said RF transmit section; and a call switching device, connected to the RF receive and transmit sections, said switching device communicating information between a first subscriber unit and a second subscriber unit, said first and second subscriber units in communication with the radio port wherein the first and second subscriber units communicate directly via the radio port and independently of any other switching device.

2. The radio port of claim 1, wherein said switching device comprises a time slot interchange unit for removing and inserting information into a memory buffer for temporary storage between reception and transmission.

3. The radio port of claim 2 wherein the time slot interchange unit comprises a digital signal processor (DSP) and the memory buffer comprises random access memory (RAM).

4. A radio port in a wireless communication system comprising:

a plurality of antennas;

an RF receive section for receiving digital information in time division multiple access (TDMA) format, the RF receive section including a diversity selection unit receiving an input signal from each of the antennas;

an RF transmit section for generating a time division multiplexed (TDM) output signal to be transmitted over at least one of the antennas;

an analog port adapted for connection to an analog telephone line; and a databus interconnecting said RF receive section, said RF transmit section, and said analog port.

5. The radio port of claim 4, wherein said analog port includes a digital signal processor.

6. The radio port of claim 4, wherein said plurality of antennas are positioned spatially and angularly diverse from each other.

7. The radio port of claim 4 further comprising a digital dataport for receiving and transmitting digital signals, said digital dataport in communication with said databus.

8. The radio port of claim 4 further comprising a cable television transport module in communication with said databus for modulating and demodulating information from said databus on cable television transmission lines.

9. The radio port of claim 4 further comprising a circuit having two receive chains for downconverting radio frequency signals in a wireless personal communications system, each receive chain comprising:

a first mixer coupled to a first local oscillator for producing an adjustable first local oscillator frequency;

a second mixer switchably coupled to a second local oscillator centered at a predetermined second local oscillator frequency; and a third mixer coupled to a third local oscillator centered at a predetermined third local oscillator frequency.

10. The radio port of claim 9, wherein the first local oscillator frequency is adjustable in the range of 2.125 to 2.205 GHz.

11. The radio port of claim 9, wherein the second oscillator frequency is 225.85 Mhz.

12. The radio port of claim 9, wherein the third local oscillator frequency is 9.932 MHz.

13. A radio port for receiving and transmitting digital information using a TDM/TDMA protocol in a personal access communications system (PACS) comprising:

a plurality of antennas;

an RF receive section including a diversity selection unit receiving an input signal from each of the antennas;

an RF transmit section for generating an output signal to be transmitted over at least one of the antennas;

a databus interconnecting said RF receive section and said RF transmit section;

said radio port in communication with at least one subscriber unit; and said radio port connected to at least one radio port controller by cable television wire, wherein said radio port controller is at the headend of a CATV communication link.

14. The radio port of claim 13, further comprising an analog port in communication with said databus and adapted for connection to an analog telephone line.

15. The radio port of claim 4, further comprising a universal circuit board capable of functioning as one of a radio port and a subscriber unit, said universal circuit board having a memory block containing a signal encoding/decoding program.

16. The radio port of claim 4, wherein the universal board further comprises a switchably enabled SLIC.

17. The radio port of claim 4, wherein the universal board further comprises at least two antennas.

18. A method of communicating information in a wireless personal communications system comprising the steps of:

communicating information from a first subscriber unit to a radio port over a TDM/TDMA air interface, the radio port having a memory buffer and a time slot interchange unit;

receiving the information at the radio port and shifting said information into the memory buffer with the time slot interchange unit in the radio port for temporary storage;

shifting the information from the memory buffer with the time slot interchange unit; and transmitting the information from the radio port to a second subscriber unit over the TDM/TDMA air interface, whereby the first and second subscriber units communicate directly through the radio port.

* * * * *